United States Patent [19]

Bell

[11] Patent Number: 4,827,347

[45] Date of Patent: May 2, 1989

[54] ELECTRONIC CAMERA WITH PROOFING FEATURE

[75] Inventor: Cynthia S. Bell, Webster, N.Y.

[73] Assignee: Eastman Kodak Company, Rochester, N.Y.

[21] Appl. No.: 234,788

[22] Filed: Aug. 22, 1988

[51] Int. Cl.⁴ .............................................. H04N 1/29
[52] U.S. Cl. .................... 358/224; 358/906; 358/210; 358/909
[58] Field of Search ................ 358/224, 210, 909, 76, 358/335, 906

[56] References Cited

U.S. PATENT DOCUMENTS

| | | | |
|---|---|---|---|
| 4,489,351 | 12/1984 | d'Alayer de Costemore | 358/906 |
| 4,692,792 | 9/1987 | Matsumoto | 358/76 |
| 4,742,369 | 5/1988 | Ishii et al. | 358/906 |
| 4,746,993 | 5/1988 | Tada | 358/909 |
| 4,757,388 | 7/1988 | Someya et al. | 358/909 |
| 4,758,883 | 7/1988 | Kawahara et al. | 358/909 |
| 4,774,575 | 9/1988 | Takayama | 358/335 |

Primary Examiner—James J. Groody
Assistant Examiner—Kim Yen Vu
Attorney, Agent, or Firm—Edward Dugas

[57] ABSTRACT

A camera comprised of an electronic imager and a plurality of display/frame stores. Each of the plurality of display/frame stores is individually selectable, for example, by a transparent touch-sensitive media positioned over the plurality of display stores. The selection acts to either retain or to discard the displayed image. Retained images may be downloaded to an optional memory module in the camera or to a larger, non-integral, data base/printer for providing finished photos of the images selected for saving. An auxiliary storage may be attached to expand the number of images that may be retained prior to downloading.

13 Claims, 9 Drawing Sheets

ELECTRONIC CAMERA WITH PROOFING FEATURE

TECHNICAL FIELD OF THE INVENTION

The present invention relates to an electronic camera for electronically recording and displaying a plurality of images and, more particularly, to such a camera having a selection feature for proofing the images of each display frame to retain only those images desired by the photographer.

BACKGROUND OF THE INVENTION

Electronic cameras using solid state image sensing devices such as a charge coupled device (CCD) have been receiving increased interest as a potential replacement for the universally accepted silver halide film type camera. Within the electronic camera, the optical image is converted to electrical signals, which are then stored in various types of memory devices. These memory devices can then be addressed at a later date to redisplay the image. They may also be addressed for purposes of transferring the stored image signals to another type of storage device such as a video tape. Some electronic cameras also provide a single image display device, which is generally located on the back of the housing, to provide the photographer with a captured image that may be viewed for purposes of determining if the image should be retained.

A patent of interest for its teaching in this area is UK patent application GB No. 2,089,169A published June 12, 1982, wherein a solid state still camera captures images and, with the use of a high-speed A/D converter, converts the images for storage in a temporary memory. The temporary memory can then be downloaded into a larger, more permanent solid state memory of the type that can hold more than one picture. The patent describes a magnetic bubble memory as being one form of larger, permanent solid state memory. Others mentioned are a removable memory chip and/or memory (magnetic) cassette. Viewing of the stored images can then be accomplished by addressing the permanent memory store with appropriate electronics and displaying the addressed signal bits.

Another device of interest is disclosed in Japanese patent application No. 55-153581 entitled "Electronic Camera" by N. K. Kogyo et al. In that application, the camera captures the image into a solid state storage means and provides a feature wherein the photographer may access the storage means to output to a display device the image stored therein. After observing the image and making an evaluation, the photographer either erases the image and/or restores the image into the storage device.

Two additional patents of particular interest are U.S. Pat. No. 4,420,773 entitled "Electronic Photographic Camera" by K. Toyoda et al. and U.S. Pat. No. 4,456,931 entitled "Electronic Camera" by K. Toyoda. Both of these patents relate to devices similar to those previously described with the additional feature in U.S. Pat. No. '773 being that the memory unit is contained in a physically detachable module which may removed from the camera and brought to further image processing apparatus. In U.S. Pat. No. '931, the memory unit is also detachable from the camera unit and can be connected to an external memory device such as a video tape recorder.

The cameras discussed in the aforementioned patents also each have the ability to display one image of stored data on a display that is affixed to the back portion of the camera housing.

SUMMARY OF THE INVENTION

In the present invention, a camera having an electronic imager is provided with a plurality of display frame stores that are affixed to the rear portion of the camera. A selection means such as touch sensitive media is overlaid on the display frame stores and is associated with each of the plurality of display frame stores such that the photographer may select which image(s), from the plurality of displayed images, are to be retained by touching the overlay near the particular display frame. An optional memory module within the camera may be utilized to more permanently retain the selected images making room for additional images to be displayed and considered.

In a preferred embodiment of the camera, there is provided an imaging means for forming an image from an optical scene. A converter, coupled to the imager converts the image into digital signals. A plurality of addressable image display devices each sequentially receive an enabling signal for storing and displaying an image represented by the digital signals. The image display devices function to display and store the image represented by the received digital signals. Associated with each display device is a selecting means for selecting the image associated with the device for more permanent storage in a larger addressable memory. A transmitting feature is optionally provided to unload the selected images from the addressable memory for transmission to a viewer and/or printer.

From the foregoing it can be seen that it is a primary object of the present invention to provide an improved electronic camera having proofing features.

It is another object of the present invention to provide an electronic camera wherein a plurality of images may be displayed simultaneously for viewing and selecting by an operator.

It is a further object of the present invention to provide an electronic camera having the capability of storing and viewing a plurality of still pictures simultaneously.

These and other objects of the present invention will become more apparent when taken in conjunction with the following description and drawings wherein like characters indicate like parts and which drawings form a part of the present description.

DESCRIPTION OF THE PREFERRED EMBODIMENTS

Figure 1:
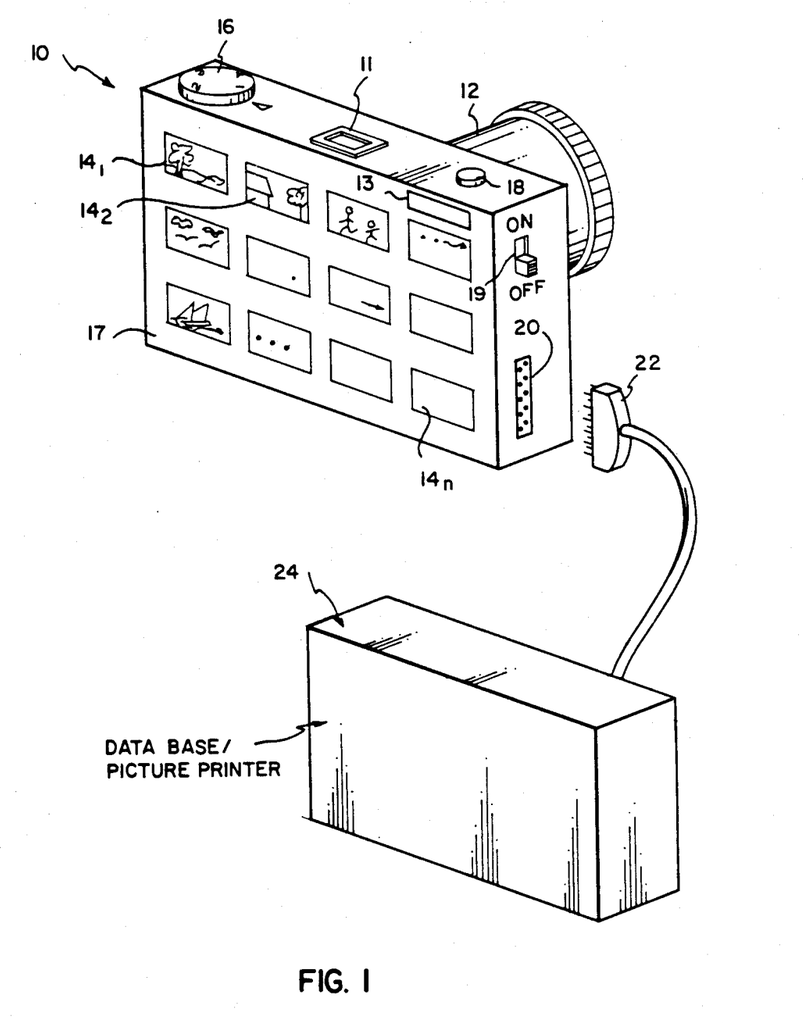
FIG. 1 is a perspective view of the preferred embodiment of the present invention shown connectable to an external memory downloading device and printer.
Figure 4:
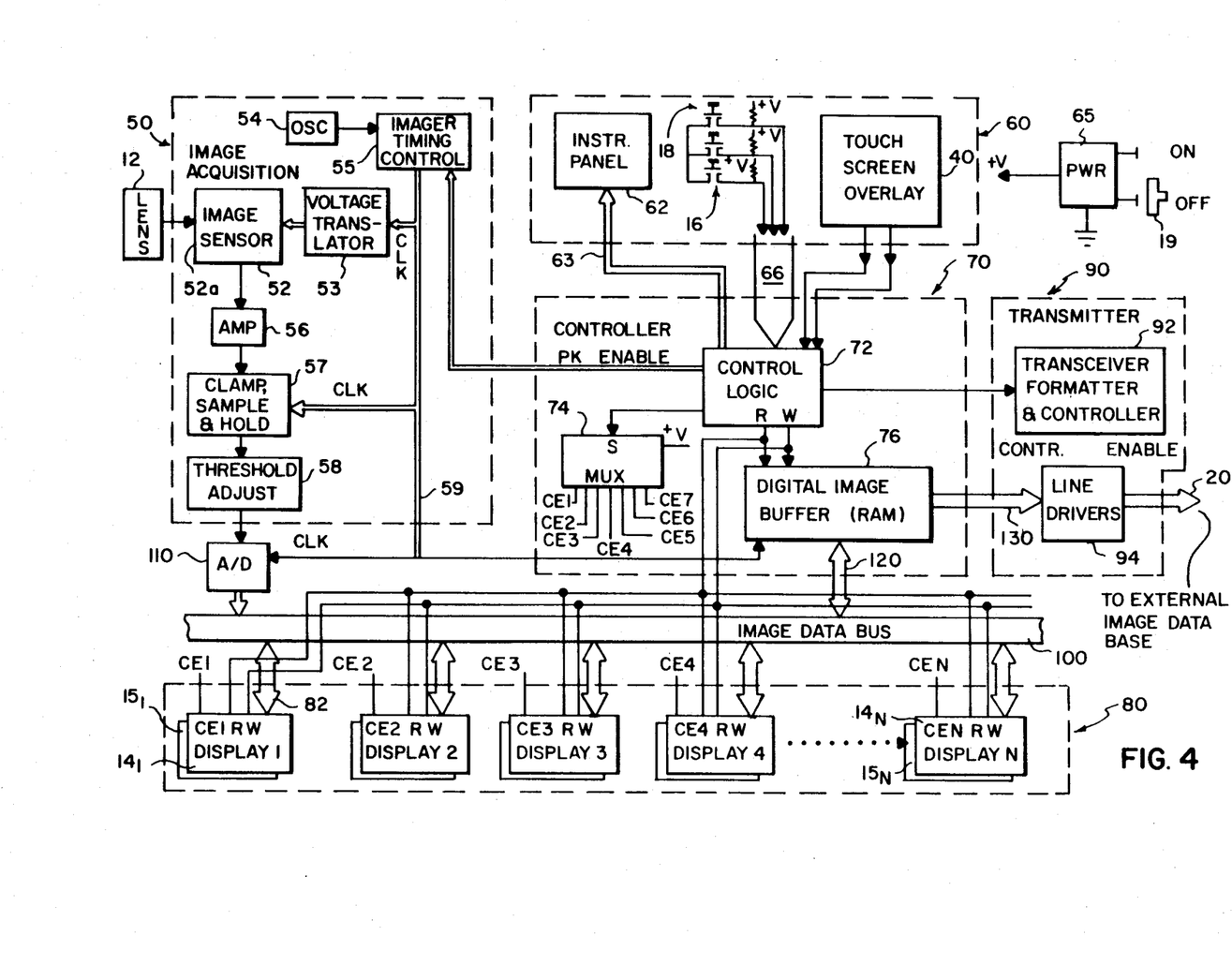
FIG. 4 is a schematic block diagram of the electronics used to capture and to display images.

Referring to FIG. 1, the camera 10 is formed with an outer housing 17 supporting a lens assembly 12 for directing optical images to an image acquisition subsystem 50 contained within the housing 17 (shown in FIG. 4 as part of the camera's internal electronics). The images received by the lens assembly 12 and the acquisition subsystem 50 are displayed on a plurality of display stores $14_1$ through $14_n$. A mode selection switch 16, under photographer control, functions to place the camera in the desired operating mode. A mode indicator viewing window 11 provides a view to an instruction panel which carries messages to the operator to indicate the status of the camera's operating mode. A snapshot button 18 cooperates with the internal electronics to permit the photographer to snap an image into the internal image storing electronics. A viewfinder 13 is provided to assist the photographer in framing the desired image. As an image is stored into the internal electronics by the activation of the button 18, it is also displayed on one of the display stores 14.

An off-on switch 19 when activated connects a power source 65 (see FIG. 4) to the camera's electronics.

An electrical connector receptacle 20 and an electrical connector 22 are utilized to connect an external remote image base/picture printer 24 to the camera 10. Images stored within the camera 10 can then be downloaded to a more permanent store in the data base and also may be printed into either a negative or a positive print.

Figure 2:
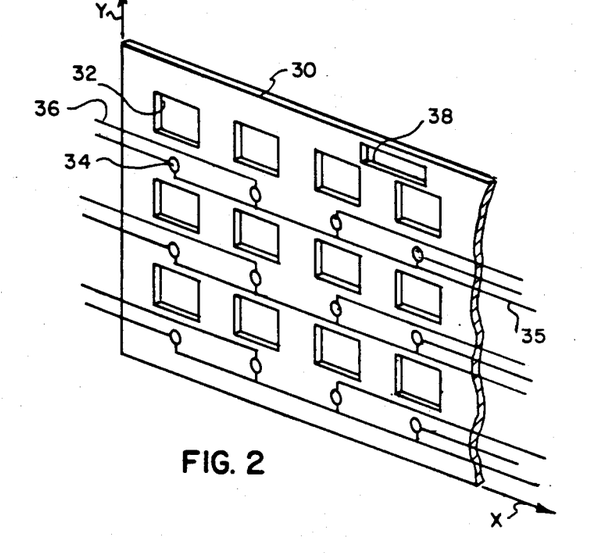
FIG. 2 is a partially cutaway perspective view of a selection means that may be associated with each of the display devices of FIG. 1.

Referring to FIG. 2 in conjunction with the camera 10 of FIG. 1, a selection means, such as an overlay 30 has a plurality of openings 32 defined therethrough corresponding in size and location to the size and location of the plurality of display stores $14_1$–$14_n$ on the back housing of the camera body 17. Also provided therethrough is an opening 38 corresponding to the location and sizing of the viewfinder window 13. Positioned adjacent to each of the openings 32 is a touch switch 34, connected by conductors 35 and 36 to a source of power. In operation, the photographer can press a button switch 34 which will make electric contact between conductors 35 and 36 to provide a selection signal for retaining in a semi-permanent storage device the image displayed in an associated store display 14.

Figure 3:
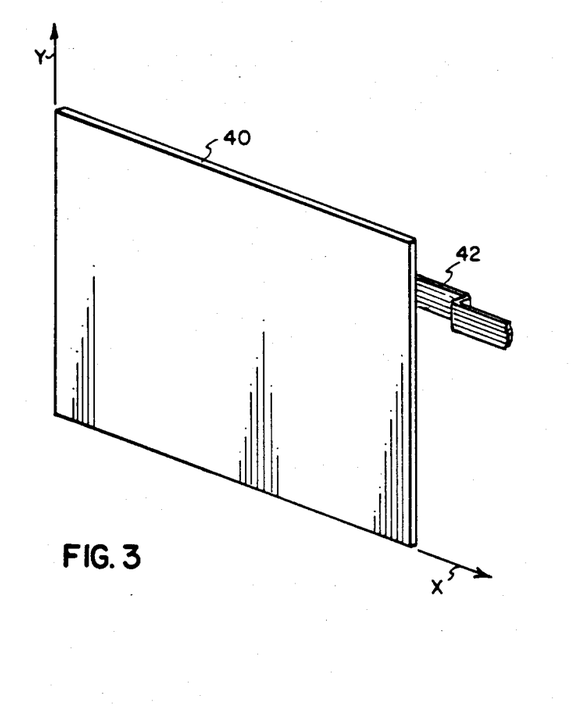
FIG. 3 illustrates, in perspective view, a touch type overlay which may be used with the display devices of FIG. 1.

A second type of selection means is illustrated in FIG. 3 comprised of a transparent sheet 40 having grid electronics (not shown) embedded therein which is coupled by means of a cable 42 to appropriate selection electronics shown more specifically in FIG. 4. The selection means 40 is of the common touch screen type which provides an XY coordinate signal corresponding to the position of the finger of the photographer when the person touches the selection means 40. The selection electronics thus provides a unique selection signal corresponding to the position of each of the display stores 14. The selection signal can then be used to activate a semi-permanent storage device for storing the image associated with the particular store display.

Figure 5:
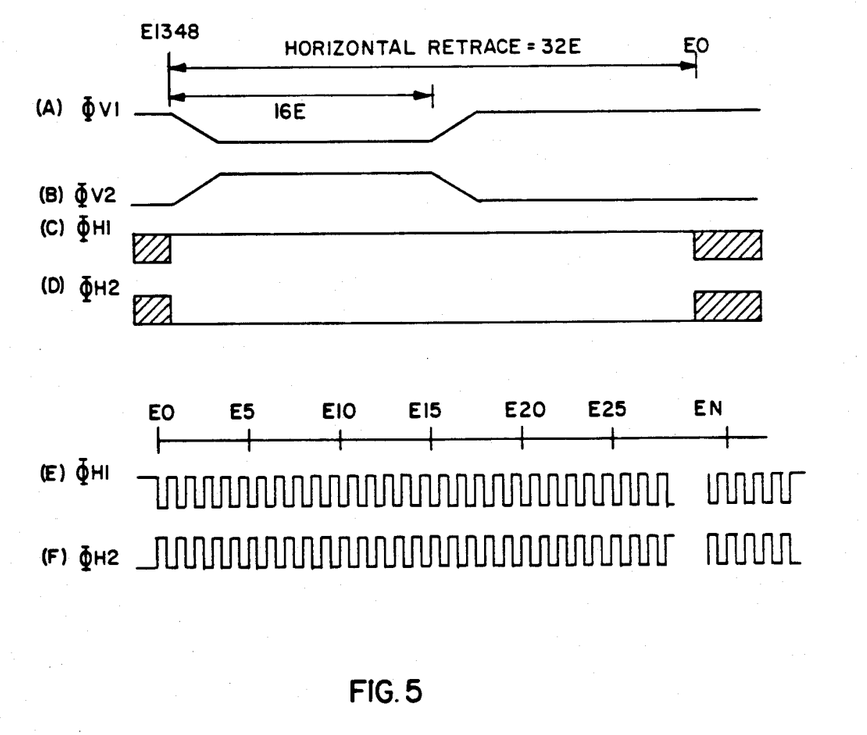
FIG. 5 is a group of waveforms useful in understanding the image capture device.
Figure 6:
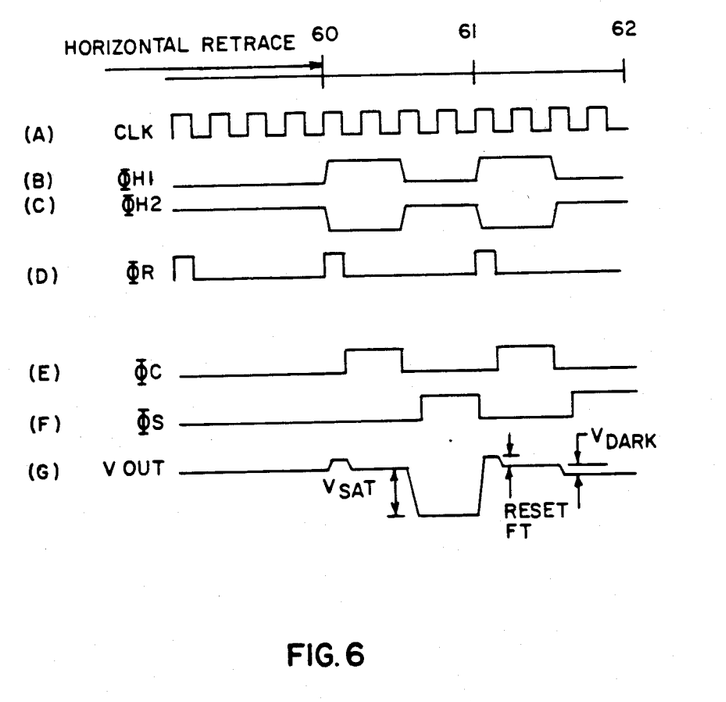
FIG. 6 is a group of timing waveforms useful in understanding the operation of the electronics of the present invention.

Referring now to FIG. 4, an image acquisition subsystem 50 receives the optical image from the camera's lens 12 which focuses the image onto the image plane 52A of an image sensor 52. The image sensor 52 may be of the 1320(H)×1035(v)-element type supplied by Eastman Kodak Company under their product identifier KAF-1400. The image sensor 52 is activated to the image sensing mode by the photographer pressing the snapshot button 18 to cause a control logic block 72 to generate a PK enable signal. The PK signal permits the button 18, when depressed, to control the application of a clocking signal CLK to a voltage translator 53. The control logic block 72 forms a part of a controller 70. An imager timing control circuit 55 receives a fixed frequency signal from an oscillator 54. The timing control circuit 55 also receives the picture enable signal PK, from the control logic block 72. The signal CLK is derived from the fixed frequency signal and is provided to the camera's electronics by a clock bus 59. The voltage translator 53, in response to the clock signal CLK, provides various clocking and control signals to the image sensor 52 to activate the sensor to store the optical image impinging on the sensor. The various clocking and control signals are shown in FIGS. 5 and 6. Output signals from the image sensor 52 are amplified by an amplifier 56 and are directed to a sample and hold circuit 57. The sample and hold circuit also receives the CLK signal from the image timing control circuit 55 over the clock bus 59. A threshold adjust circuit 58 receives the output from the sample and hold circuit 57 and operates to provide a black level clamp to the signals. The imaging signals from the threshold adjust circuit 58 are then directed to an A/D converter 110. The A/D converter 110 also receives the clocking signal CLK and provides at its output the digitized version of the signals appearing at its input.

The output of the A/D converter 110 is connected to an image data bus 100. A multiple image display subsystem 80 is shown comprised of, a plurality of image display and storage devices $14_1$ through $14_n$ and associated refresh and memory devices $15_1$ through $15_n$, each connected to the image data bus 100 by means of individual buses 82. Each display and storage device has an R (read) and a W (write) input terminal connected in parallel to the other displays and to correspondingly labeled outputs from the control logic block 72. In addition, each display has its own individual enabling input terminal labeled CE1 through CEn. The enabling signals are received from the output of a multiplexer 74. The multiplexer 74 receives at its input the selection signal from the control logic block 72 for selecting which output is the receive the enabling signal. The multiplexer 74 provides the enabling signal to a specific display enabling input terminal commencing with the display $14_1$ such that the first image is stored and displayed in display $14_1$ and the second image is stored and displayed in display $14_2$, etc. up to and including display $14_n$.

In the preferred embodiment of the invention, the displays $14_1$ through $14_n$ may be neutralized, twisted, nematic LCD displays with back lighting and/or of the type employed by Seiko in their wristwatch TV, and/or of the type employed by Casio in the pocket-size TV.

A user input/output subsystem 60 is comprised of the instruction panel 62, which may be an LCD device, rotary switch 16, picture-taking switch (button) 18 and the selection means (touch screen overlay 40). The XY coordinate signals generated by the touch screen overlay 40 are received by the control logic block 72. Also received by block 72, over a bus 66, are switch signals from the switches 16 and 18. The control logic block 72 forwards instruction signals to the instruction panel 62 over a bus 63. A digital image buffer 76, which may be a RAM, receives the outputs R and W from the control logic block 72 along with the CLK signal from the bus 59 and functions as the semi-permanent storage device. The input to the digital picture buffer 76 is coupled to the image data bus 100 by means of a subbus 120. The digital picture buffer 76 may be omitted if long-term storage is not required. Also, the digital picture downloading of the digital picture buffer 76 by cable is optional. A RAM chip fashioned on a plug-in board, for example, a credit card size board, could also be connected to the camera to download the buffer. The output of the digital image buffer 76 is coupled over a bus 130 to a block of line drivers 94. The outputs from the line drivers 94 are connectable, via connector 20, to the image data base/picture printer 24, shown in FIG. 1. Control and enable signals for the line drivers are received from a transmitter subassembly 90 by means of a transceiver formatter and controller 92. The transceiver formatter 92 receives control signals from the control logic circuit 72 and responds to these signals to control the flow of the image data from the image buffer 76 to the image data base/printer 24.

Upon receiving an enable signal from the enable bus, the imager timing control block 55 initiates signals to remove the off-state charge collection. This is accomplished in a manner consistent with the transfer of imagewise charge and depends on the type of image sensor. For example, with a two-phase CCD (charge-coupled device) or BBD (bucket brigade device) the clockouts are accomplished by rapid sequential clocking of a horizontal shift register (not shown part of CCD image sensor chip). The sequential clocking is shown in FIG. 5 as E and F, $\Phi H1$ and $\Phi H2$. These are the picture 'element rate' clocks. When the last element of the horizontal shift register has been clocked out, the next row of picture elements (pixels) are transferred in parallel into the horizontal shift register. This transfer is accomplished by stopping the horizontal clocks as shown in FIG. 5, C and D. The two phases of vertical gates, A and B are clocked, transferring the charge into the waiting horizontal shift register elements. The shift register is then clocked out as before. This procedure is repeated until all rows of the imager have been shifted out.

FIG. 6 illustrates the waveforms that are used by the output structure of the imager. A denotes the master clock CLK from which the other timing signals are derived. The picture element rate clocks are shown in B and C. The output driver (not shown part of CCD image sensor chip) is reset to a reference voltage prior to each pixel measurement. The reset clock is shown in D. After reference voltage setting, the output node settles to a slightly different level due to the channel charge from the reset switch transistor. Thus, the stable level is sampled at timing indicated by $\Phi C$, the waveform denoted E in FIG. 6. The output voltage showing these steps is denoted G. Following the reset and settling of the output driver, the pixel signal charge is measured. The timing of this is denoted $\Phi S$ in waveform F. The intensity of the image determines the amount of pixel charge and the output voltage will reflect that intensity. The fact sheets supplied by EASTMAN KODAK COMPANY with their image sensor contains the schematic and timing diagrams which describe the previously discussed shift registers and waveforms.

Figure 7:
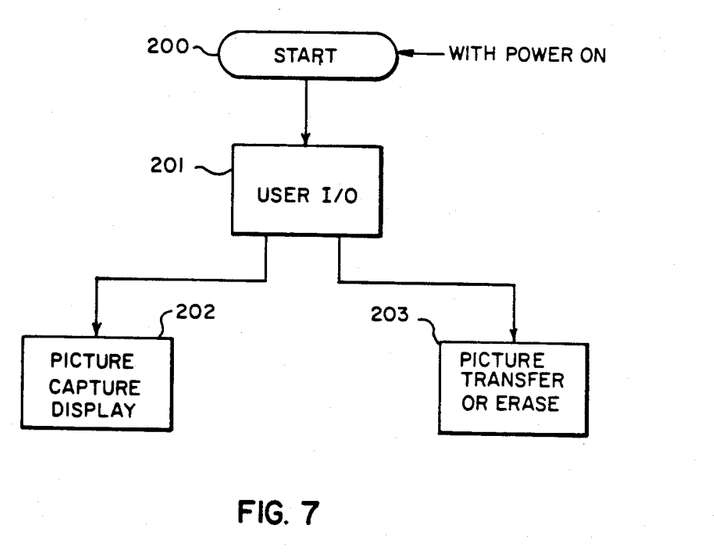
FIG. 7 is a first level flow diagram of the operation of the camera of the preferred embodiment.

Referring now to FIG. 7, which is a flow diagram of the operating software program for the camera 10, illustrating the hierarchy of the operating modules, the start block 200 commences with switch 19 being placed in the ON position. A user I/O (in/out) instruction module 201 is activated directing the user, through prompt codes displayed by the instruction panel 62, to a selection of a picture capture display mode 202 or a picture transfer or erase mode 203.

Figure 8:
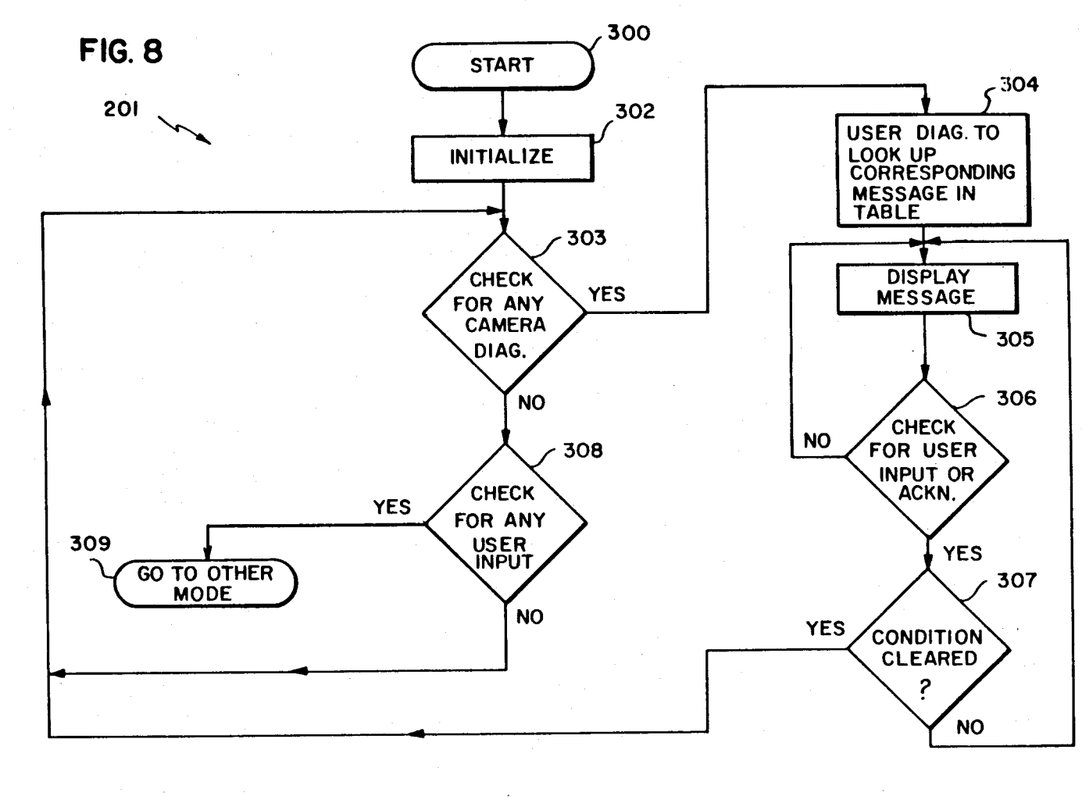
FIG. 8 is a flow diagram illustrating the operation of the camera in the user I/O mode.

FIG. 8 illustrates a flow chart depicting the process steps of the user I/O module 201. The start block 300 activates the initialize block 302 to perform an initialization of the camera's circuitry. A decision block 303 is addressed for checking for any camera diagnostics indicating a malfunction. If the answer is YES, the decision block branches to the diagnostics block 304 which looks up the message in a memory stored table that corresponds to the malfunction. The message is displayed by action block 305, causing the message to be displayed in the display window 11 via the instruction panel 62. A decisioning block 306 checks to see if the user has provided any input such as acknowledging the existence of the display message. If that has not occurred, the block decisions to a NO and continues to loop until the user provides the necessary input or acknowledgement, at which time the decision block reverts to the YES branch. The YES branch is directed to a questioning block 307 which questions whether the condition has been cleared. If the answer is NO, the output is looped back to the input to the display message block 305 to maintain the message display. If the condition has been cleared, the decision block branches to a YES answer and to the input of the check for camera diagnostics block 303. With all conditions clear, block 303 outputs a NO condition to the input of block 308. Block 308 checks for any user input and, if there is none, branches to the NO output which loops back to the input of block 303. This process continues until a YES answer is received. At that point, a go to other mode block 309 is activated. Block 309 selects either mode 202 or mode 303 in response to the user selecting the mode through the positioning of switch 16.

Figure 9:
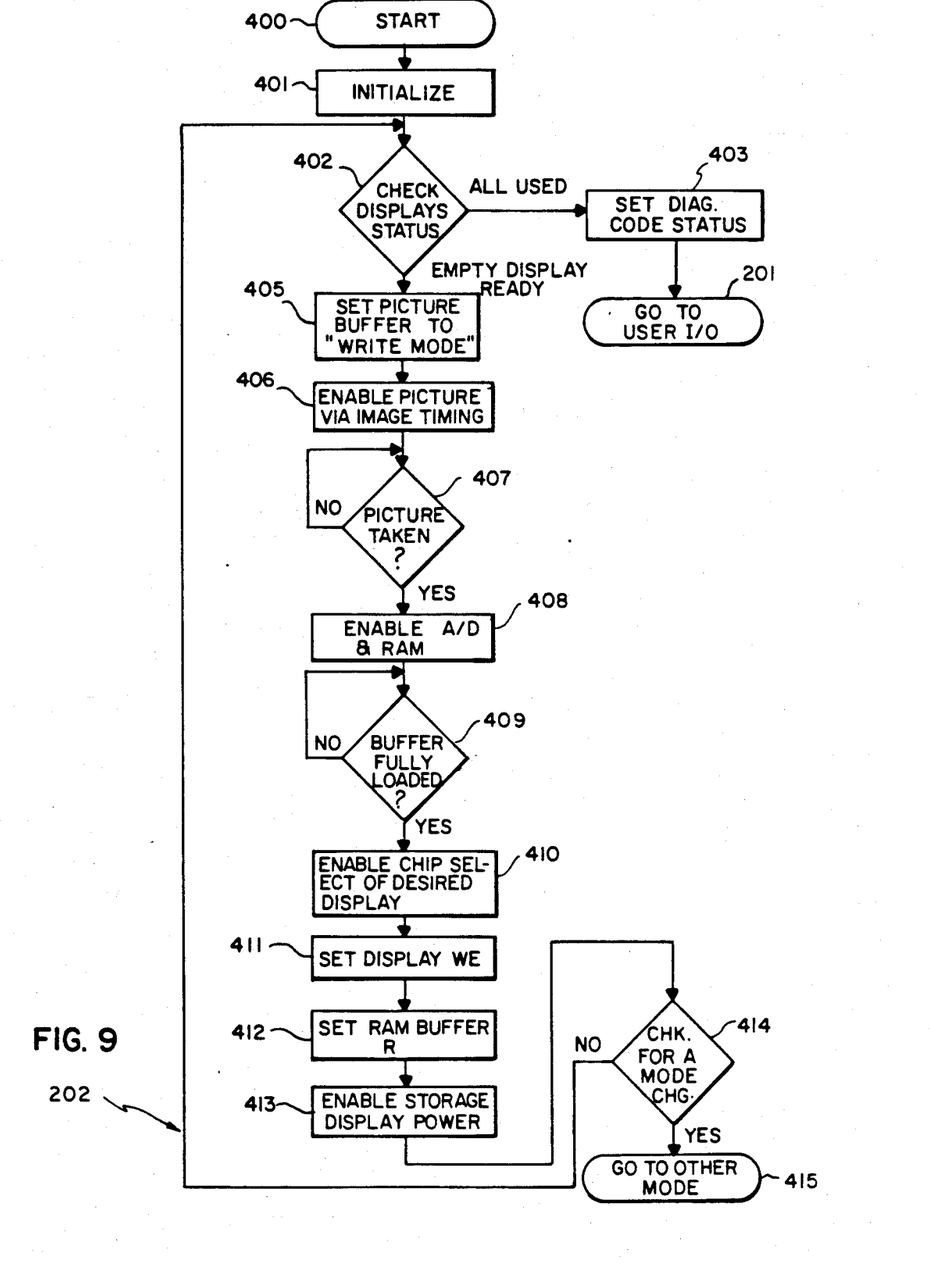
FIG. 9 is a flow diagram illustrating the operation of the camera in the picture capture mode.

FIG. 9 is a flow diagram of the procedural steps for the picture capture sequence mode 202. On being activated by the selection mode block 309, module 202 is started with block 400. Block 400 activates an initialized block 401 which in turn provides an output to a decision block 402. Block 402 checks to see if any of the storage displays are empty. If all the displays are used, the block branches to block 403 which sets diagnostic code status to indicate that the program is to go to the user I/O module 201 which in turn will provide the user with a display message through window 11 indicating all of the display storage elements are used. If there are empty displays which are ready to receive an image, block 405 is activated to set the picture buffer to a "Write" mode and to enable the capture of the picture by activating the enable picture via image timing block 406. Once enabled, the operator may then press the snapshot button 18 to take the picture. Decision block 407 is responsive to the button circuitry 16 for determining if the picture has been taken. If not, a loop back to the input to the picture taken logic block occurs until a YES answer is detected. The YES answer activates block 408 to enable the A/D analog-to-digital converter 110 and the RAM buffers 76. A questioning block 409 questions whether the RAM buffers 76 are fully loaded. If not, additional time is provided with the loop back to the input of the questioning block 409. With the RAM buffers 76 fully loaded the answer from block 409 will be YES which in turn will enable the chip select for the desired display via block 410 which in turn will set the display write enable terminal W via block 411 which in turn will set the RAM buffer read terminal R via block 412 and in turn will enable the storage display CEl-n via block 413. A question block 414 questions whether a mode change has occurred after the taking of this picture, if not, a NO answer loops back to the input of block 402 to again determine whether there are any empty displays after the taking of this picture. If the answer is YES, then a selection is made by block 415 to go to the selected mode.

Figure 10:
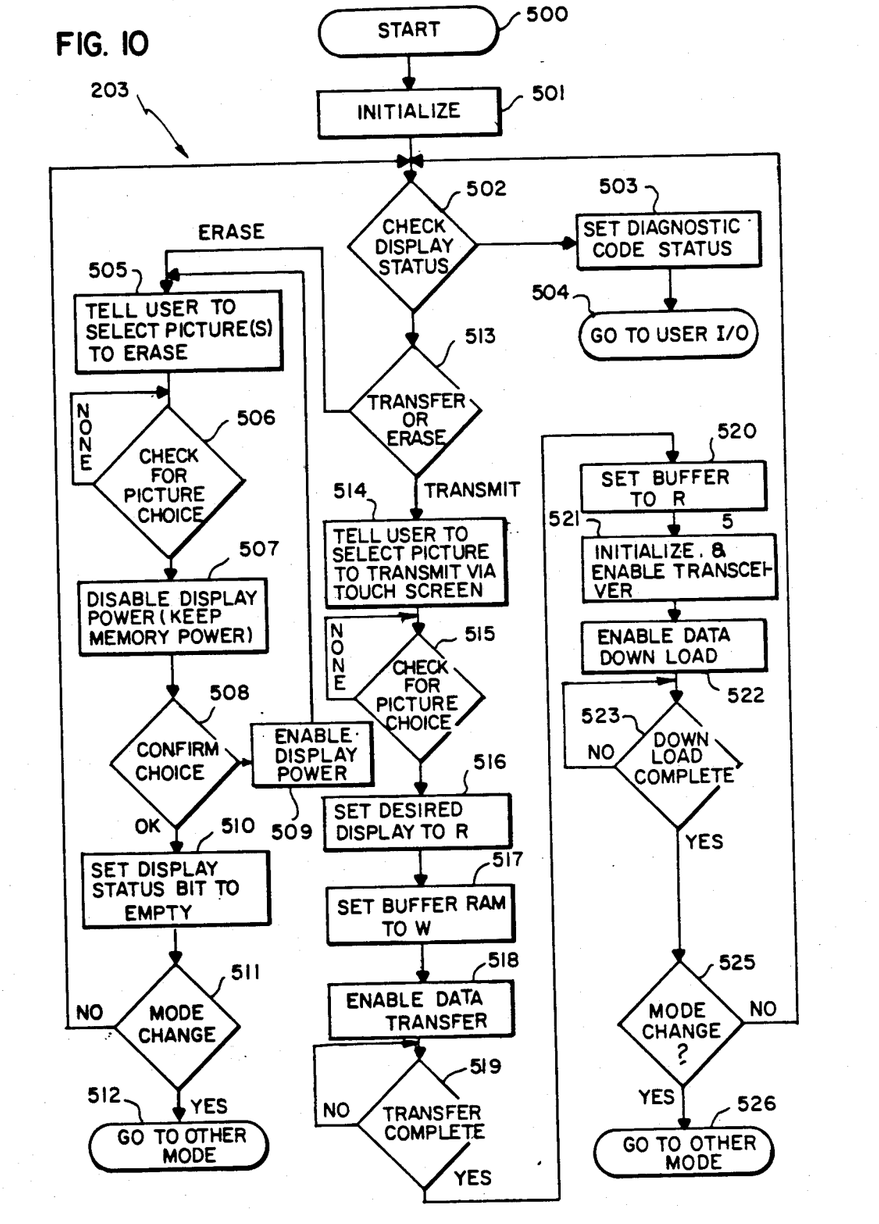
FIG. 10 is a flow diagram illustrating the operation of the camera in the picture transfer/erase mode.

Referring to FIG. 10, wherein is shown a flow diagram for the picture transfer/erase sequence module 203, upon the start block 500 being selected the initialize block 501 is activated to initialize all associated circuitry. A status block 502 checks the display status and, if none of the displays have been used, the diagnostics are set via block 503 to cause that status to be displayed by the instruction panel 62. The program then moves to block 504 which causes a branch to the user I/O module 201. If displays have been used, block 502 transfers control to the transfer or erase block 513 wherein a selection for transmit moves the process to block 514 to tell the user to select the picture to be transmitted via the touch screen 40. In a questioning block 515, sampling is made to determine if the touch screen has been operated. If not, a loop is formed until a touch has occurred. Upon the occurrence of a selection, via the touch screen, block 516 is activated to set the desired display to a read enable mode. This in turn, sets the buffer RAM to a write enable mode via block 517. Block 518 enables the data transfer and the questioning block 519 samples the transfer to determine if it is complete. If not, the transfer questioning continues until a YES answer is received. A YES answer from block 519 is directed to block 520 which sets the buffer RAM to a read enable mode. Block 521 initializes and enables the transceiver 92 when the buffer RAM is placed in the read enable mode. Block 522 enables the data to be downloaded to the data base/picture printer 24 shown in FIG. 1.

Questioning block 523 questions whether the download has been completed and loops back to continue the questioning until the answer is YES. With a YES answer, block 525 is enabled questioning whether a mode change is to take place after the downloading. If NO is the answer, a loop back to the input of block 502 is accomplished to set up the next transfer or erase operation. If the answer is YES, then block 526 directs the program to the selected mode.

Returning to the transfer or erase questioning block 513, if the erase mode is selected, the user is told to select the picture to erase by the action of block 505. Questioning block 506 checks the selection block output to determine if a selection has been made. If none has, then the questioning block loops on to itself and continues in that mode until an answer of YES is received. A YES answer activates block 507 which disables the display power while maintaining power to the memory. Questioning block 508 is thus activated and questions the operator's selection of the particular display to be erased. If the operator indicates that it is a wrong choice, then enable display power block 509 is activated and the program is looped to the input to block 505 to commence the selection process again. If the choice is acceptable, then block 510 is activated setting the display status bit to indicate an empty condition. This in turn will activate the mode change questioning block 511 which, if the answer is NO, indicates that a mode change is not desired. This will cause a branch to the input of the check display status block 502. If the answer is YES, block 512 will be energized directing the program to the selected mode.

The procedural programs 201, 202, and 203 can be implemented in a software program or in firmware embedded in a microprocessor that forms the control logic 72.

While there has been shown what is considered to be the preferred embodiment of the present invention, it will be manifest that many changes and modifications may be made therein without departing from the essential spirit of the invention. It is intended, therefore, in the annexed claims to cover all such changes and modifications as may fall within the true scope of the invention.

I claim:

1. An electronic camera associated with a proofing feature comprising:
    imaging means for converting an image into corresponding electrical signals;
    a plurality of display means for receiving in turn the corresponding electrical signals associated with one image from said imaging means and for displaying the image associated with the received electrical signals;
    means associated with said plurality of display means for selecting the displayed images for storage; and
    storage means for storing the selected images.

2. An electronic camera associated with a proofing feature comprising:
    imaging means for converting an image into electrical signals;
    a plurality of addressable image display devices for receiving said electrical signals from said imaging means in turn and for displaying the image associated with the received electrical signals;
    means associated with each of said image display devices for selecting the displayed images for storage; and
    storage means for storing the selected images.

3. An electronic camera according to claim 2 and further comprising:
    an image printer;
    means coupled to said storage means for transmitting the selected images from said storage means to said image printer.

4. An electronic camera according to claim 2 and further comprising:
    a remote auxiliary storage means;
    means coupled to said storage means for transmitting the selected images from said storage means to said remote auxiliary storage means.

5. An electronic camera according to claim 2 and further comprising:
    a transparent touch sensitive media overlaying the plurality of addressable image display devices for providing a selection signal in response to a touch adjacent the display device, displaying a desired image, to cause the image to be stored in said storage means.

6. An electronic camera according to claim 2 and further comprising:
an overlay having a plurality of openings therethrough corresponding in size and location to said plurality of addressable image display devices; and
at least one switch element associated with an addressable image display device mounted to said overlay for providing a selection signal in response to the activation of a switch element for causing a desired image to be stored in said storage means.

7. An electronic camera associated with a proofing feature comprising:
imaging means for converting an image into electrical signals;
a plurality of addressable image display devices each for receiving said electrical signals from said imaging means and for displaying an image;
means associated with each of said image display devices for selecting the displayed images for storage;
storage means for storing the selected images;
mode selection switch means for providing mode selection signals;
a software driven controller means responsive to the mode selection signals from said mode selection switch means for providing control and instruction signals;
an instruction panel means coupled to said control means for receiving said instruction signals and for displaying instructions as a function of the instruction signals; and
said control signals being directed to said imaging means, said plurality of addressable image display devices, and said storage means for controlling the conversion of an image to electrical signals and the display and storage thereof.

8. An electronic camera with a proofing feature comprising:
a camera housing;
optical means disposed on said camera housing for forming an optical image on a plane;
an image sensing means positioned at the plane for converting the optical image to electrical image signals;
a plurality of image display means positioned on said camera housing for converting said electrical image signals to a corresponding viewable image with one image each being displayable on an associated image display means; and
selection means associated with each of said plurality of image display means for selecting those images displayed by said image display means for further processing and for clearing those display means of images that are not selected.

9. An electronic camera according to claim 8 and further comprising:
an image storage means housed within said camera housing and capable of storing a plurality of electrical image signals corresponding to the images selected with said selection means.

10. The electronic camera according to claim 9 and further comprising:
a photographer operated picture-taking control on said camera housing for providing an image capturing signal; and
selector means coupled to said image display means for sequentially enabling each image display means in response to the provided image capturing signal to display the captured image.

11. An electronic camera with a proofing feature comprising:
a camera body having at least a front and a back;
an optical means extending from the front of said camera body for forming an optical image;
an image acquisition means positioned to receive the formed optical image from said optical means for converting the optical image to electrical image signals;
an image buffer for temporarily storing the electrical image signals from said image acquisition means;
a plurality of image displays affixed to the back of said camera, each having an enabling input;
an image data bus coupling said image buffer to said plurality of image displays;
a selection means for selecting which images stored in said plurality of image displays will be retained for storage;
a viewable instruction panel responsive to electrical control signals for displaying instructions as functions of said electrical control signals;
control logic means connected to said selection means, said image buffer, said image acquisition means and said viewable instruction panel for controlling the storage of images in each of said plurality of image displays in response to a picture-taking signal and for generating electrical control signals to cause appropriate display instructions to be displayed on said viewable instruction panel; and
a multiplexer having a selection input for receiving a control signal from said control logic means and a plurality of enabling outputs one each connected to the enabling input of an image display for providing an enabling signal on one of said outputs to a selected image display for causing electrical image signals to be converted to a displayed image.

12. An electronic camera according to claim 11 and further comprising:
means for downloading the electrical image signals temporarily stored in said image buffer to storage external of said camera.

13. An electronic camera according to claim 11 wherein said selection means is an overlay, positioned over said plurality of image displays for providing a selection signal representative of an operator selected image display.

* * * * *